United States Patent [19]

Bubeck

[11] Patent Number: 6,078,984
[45] Date of Patent: Jun. 20, 2000

[54] METHOD OF OPERATING A CONTROL SYSTEM WHICH INCLUDES A NONVOLATILE MEMORY UNIT HAVING MEMORY BANKS AND A VOLATILE MEMORY UNIT

[75] Inventor: Helmut Bubeck, Markgröningen, Germany

[73] Assignee: Robert Bosch GmbH, Stuttgart, Germany

[21] Appl. No.: 08/824,789

[22] Filed: Mar. 26, 1997

[30] Foreign Application Priority Data

Mar. 26, 1996 [DE] Germany .......................... 196 11 871

[51] Int. Cl.[7] ........................................... G06F 12/02
[52] U.S. Cl. ................................................... 711/5
[58] Field of Search ........................ 711/5, 173, 103, 711/170

[56] References Cited

U.S. PATENT DOCUMENTS

| | | | |
|---|---|---|---|
| 4,368,515 | 1/1983 | Nielsen | 711/212 |
| 5,235,696 | 8/1993 | Schaff | 711/202 |
| 5,530,938 | 6/1996 | Akasaka et al. | 365/218 |
| 5,564,032 | 10/1996 | Aota et al. | 711/5 |
| 5,590,303 | 12/1996 | Shibata et al. | 711/103 |
| 5,768,194 | 6/1998 | Matsubara et al. | 365/230.03 |
| 5,796,940 | 8/1998 | Nagashima | 395/186 |
| 5,802,543 | 9/1998 | Shibayama | 711/5 |
| 5,835,926 | 11/1998 | Pesuit | 711/5 |

*Primary Examiner*—Eddie P. Chan
*Assistant Examiner*—Yamir Encarnacion
*Attorney, Agent, or Firm*—Walter Ottesen

[57] ABSTRACT

The invention is directed to a method of operating a control system which includes a nonvolatile memory unit having memory banks and a volatile memory unit for storing programs and data. Access is permitted to only a single one of the memory banks of the nonvolatile memory unit at a given time point and the memory bank permitting the access is addressable by using addresses which are located within a memory bank address space. The memory bank address space is common to all memory banks and adapted to the size of the memory banks. The nonvolatile memory and the volatile memory are driven in such a manner that the memory bank permitting the access is only accessible in part. When an addressing attempt is made via an address, which is assigned to that part of the particular memory bank which is not accessible, the volatile memory unit is shifted into a state permitting an access and the volatile memory is addressed via the address.

11 Claims, 5 Drawing Sheets

METHOD OF OPERATING A CONTROL SYSTEM WHICH INCLUDES A NONVOLATILE MEMORY UNIT HAVING MEMORY BANKS AND A VOLATILE MEMORY UNIT

FIELD OF THE INVENTION

The invention relates to a method for operating a control system which is equipped with a nonvolatile memory unit and with a volatile memory unit for storing programs and data. The nonvolatile memory unit comprises at least one memory bank. Access can be had in each case only to a single memory bank of the nonvolatile memory unit. The memory bank permitting the access can be addressed in each case by using addresses which are in a memory bank address space adapted to the size of the memory bank and which is common for all memory banks.

BACKGROUND OF THE INVENTION

An arrangement for carrying out a method of this kind is shown in FIG. 4. The arrangement shown comprises a control system in the form of a motor vehicle control apparatus 1 and a programming apparatus 2 which can be connected to the control apparatus as required. The program apparatus 2 is provided for programming the motor vehicle control apparatus 1.

The motor vehicle control apparatus 1 includes a control unit in the form of a central unit 11, a nonvolatile memory unit 12 (external ROM) and a volatile memory unit 13 (external RAM).

Motor vehicle components such as the motor, braking system and the like, which are controlled by the motor vehicle control apparatus 1, are not shown in FIG. 4.

The central unit 11 can be a microprocessor, a microcontroller or the like. In this example, the central unit 11 can be an 8-bit microcontroller having an internal nonvolatile memory (internal ROM) and an internal volatile memory (internal RAM), such as a component of the INTEL 8051 family.

The nonvolatile memory unit 12 can be an electrically erasable and programmable nonvolatile memory in the form of a flash EPROM.

The use of an electrically erasable and programmable memory has been shown to be advantageous because its content can be permanently changed at any time in a relatively simple manner which is of considerable significance, especially for errors in the stored data and programs, which were not detected initially, or in response to individual customer requests.

The use of a flash EPROM as an electrically erasable and programmable nonvolatile memory has acquired increasing significance because this memory has the combined attributes of a "normal" EPROM (high memory cell density in a small space) and of an EEPROM (electrical, and therefore simple and convenient erasure of the memory content).

The volatile memory unit 13 can, in the example, be a "normal" read-write memory (RAM).

A nonvolatile memory (ROM) is available to the central unit 11 and is comprised of the internal ROM of the central unit 11 and the external flash EPROM 12 (external ROM). A volatile memory (RAM) is available to the central unit 11 and is comprised of the internal RAM of the central control unit 11 and an external RAM 13. This is shown in FIG. 5.

Most 8-bit microcontrollers are so configured that data and programs can be stored and are stored in memory units separate from each other. As a rule, the ROM is used as a program memory and the RAM is used as a data memory.

Programs, which the central unit 11 has to execute, are also stored in the ROM in the example shown. The ROM, which is available to the central unit 11, is well suited for this purpose because it can be reprogrammed, at least partially, at any time and without too much difficulty as noted above.

However, the provision of a reprogrammable memory unit (especially a flash EPROM) imposes special requirements on the control system hardware and an appropriate drive therefor.

During reprogramming of the flash EPROM, the flash EPROM is not useable as a program memory which can be read out so that the program for executing the reprogramming must be stored at another location (that is, in the internal ROM of the central unit 11). This is necessary so that the reprogramming can be executed without difficulty.

The same applies for the case wherein the memory, which is addressable via the address line of the central unit, is too small. In this case, a memory can be used which can be partitioned into several memory banks. Each of the memory banks has a size which can be fully addressed via the address lines which are available. A switchover between the memory banks can be effected by utilizing output signals of the central unit (port output signals) which are originally not provided for addressing a memory.

A practical example of the above is the case now to be discussed. While the microcontroller used can address only 64 Kbyte memories via its 16 address lines, the required size of the provided external ROM according to FIG. 5 is 128 Kbyte. The 128 Kbyte are therefore subdivided into two 64 Kbyte memory banks between which a switchover can be selectively made as required.

If such a memory bank switchover is self-triggered by the just-activated memory bank of the external ROM, then this is problematic in that the next access of the central unit to the external ROM has a considerable probability of error. Thus, when the memory bank switchover is faster or slower than assumed, the access of the central unit to the external ROM can fail insofar that nonvalid or incorrect data (data of an incorrect memory bank) can be obtained.

To avoid the foregoing, it is therefore indicated to execute the memory bank switchover also from the internal ROM of the central unit, that is, to also store the corresponding program there.

The necessity to store specific programs or program parts in the internal ROM of the central unit has the consequence that the internal ROM is not only absolutely necessary but, under circumstances, must also have a considerable size.

It is therefore evident that a central unit 11 containing a relatively large internal ROM is more expensive than a central unit which either has no ROM or only a relatively small ROM. The reason for this is not only the hardware cost alone, but also the cost of producing the masks for programming the ROM at the manufacturer.

The foregoing notwithstanding, the central unit containing the ROM is immediately unusable when it becomes evident that a fault is located in the program stored therein or when it should become necessary to make expansions or modifications of the programs stored there. In such a case, not only the central unit storage supply is suddenly no longer useable and high expenditures must be effected for the revised mask manufacture; also, those motor vehicle control apparatus which have already been supplied must possibly be exchanged.

SUMMARY OF THE INVENTION

In view of the foregoing, it is an object of the invention to provide an improved method wherein the provision of an internal nonvolatile memory unit within the central unit can be omitted.

The method of the invention is for operating a control system, which includes a nonvolatile memory unit having memory banks and a volatile memory unit for storing programs and data, and wherein access is permitted to only a single one of the memory banks of the nonvolatile memory unit at a given time point and the memory bank permitting the access is addressable by using addresses which are located within a memory bank address space, the memory bank address space being common to all memory banks and adapted to the size of the memory banks. The method includes the steps of: driving the nonvolatile memory and the volatile memory in such a manner that the memory bank permitting the access is only accessible in part; when an addressing attempt is made via an address, which is assigned to that part of the particular memory bank which is not accessible, shifting the volatile memory unit into a state permitting an access; and, addressing the volatile memory via the address.

According to the invention, the nonvolatile memory unit and the volatile memory unit are driven in such a manner that the memory bank of the nonvolatile memory unit, which permits access, is only partially accessible and, for an addressing attempt via an address (which is assigned to the part of the particular memory bank to which no access can be had), the volatile memory unit is placed in a state which permits access, and can be addressed via this address.

Parts of each memory bank of the nonvolatile memory unit are replaced by the volatile memory unit. Stated otherwise, the volatile memory unit is merged into the address space of the nonvolatile memory unit.

In the result, a program memory is established which is made up of a volatile memory and a nonvolatile memory. That is, a central unit is provided in the control system and can also execute programs which are stored in the volatile memory.

Programs which cannot be executed from the nonvolatile memory (for example, because the memory is temporarily unavailable or is only available to a limited extent) can now, before execution, be copied into the volatile memory unit and can be executed from there and completely independently of an availability of the nonvolatile memory unit, this availability being limited or even not present under circumstances.

The reason for the missing or limited availability of the nonvolatile memory unit is without consequence. This reason can, for example, be that the nonvolatile memory unit is just being reprogrammed. The reason can, however, be, inter alia, that a switchover is just occurring from one memory bank of the nonvolatile memory unit to another memory bank of the nonvolatile memory unit.

Especially in the last mentioned case, it has been shown advantageous that, for a memory bank exchange of the nonvolatile memory unit, it is not required to execute a corresponding operation in the volatile memory unit. The nonvolatile memory unit can, instead, be configured as an intermediate memory unit common to all memory banks of the nonvolatile memory unit which can be addressed independently of the particular activated memory bank in exclusive dependency upon the address signals of the central unit and always in the same manner (via the same addresses). In this way, the volatile memory unit can remain fully available always and completely without limitation independently of the availability of the nonvolatile memory unit. The volatile memory unit in the control provided by the invention can therefore be used as a complete replacement for the internal ROM of the central unit and can even be used with still greater flexibility. The internal ROM was always provided until now.

In this way, a method has been found which permits omitting an internal nonvolatile memory unit within the central unit.

BRIEF DESCRIPTION OF THE DRAWINGS

The invention will now be described with reference to the drawings wherein.

DESCRIPTION OF THE PREFERRED EMBODIMENTS OF THE INVENTION

Figure 4:
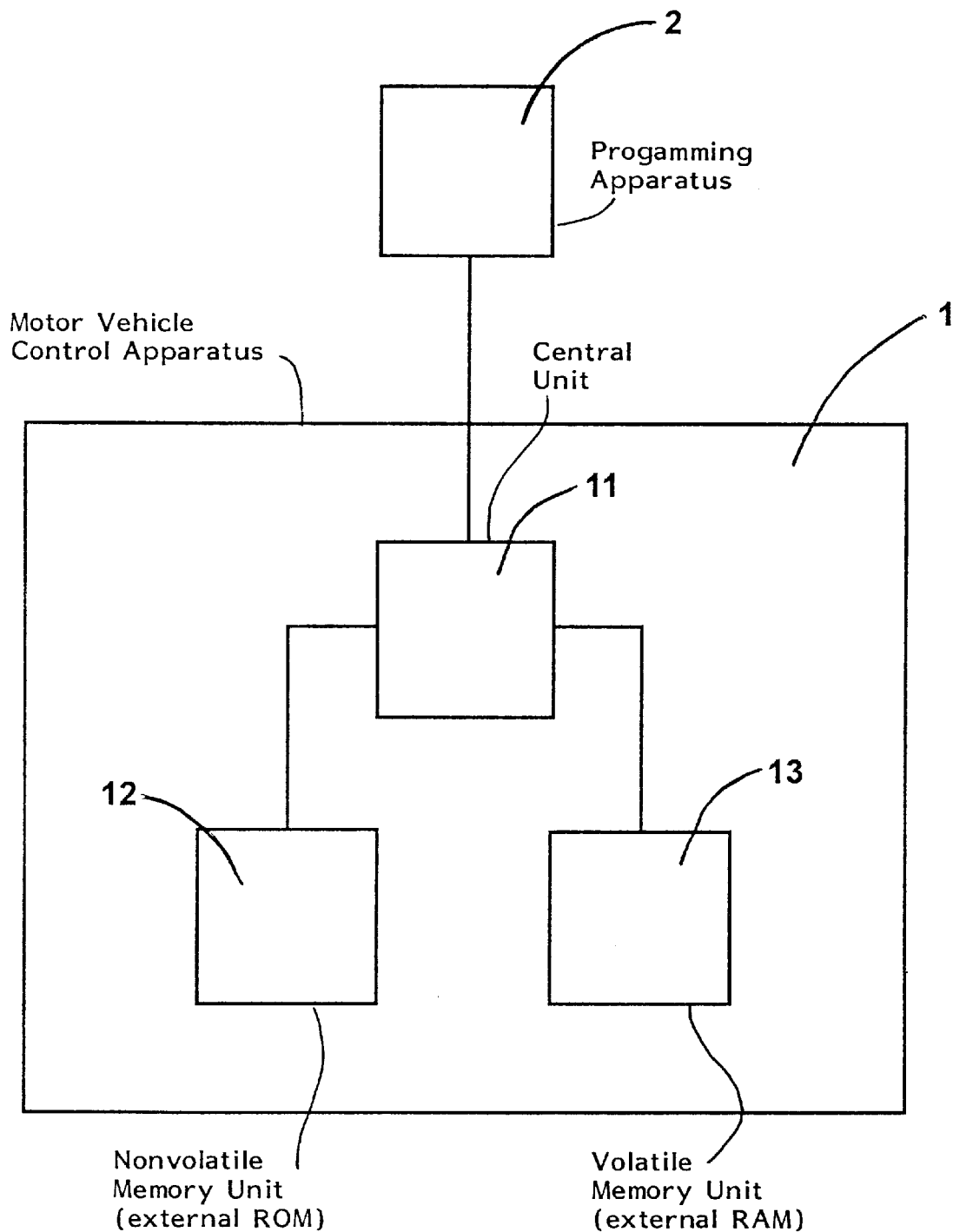
FIG. 4 is a block circuit diagram which, inter alia, shows the basic configuration of a control system in the form of a motor vehicle control apparatus; and, FIG. 5 shows the entire memory region which can be made available to a central unit contained in the motor vehicle control apparatus of FIG. 4.
Figure 5:
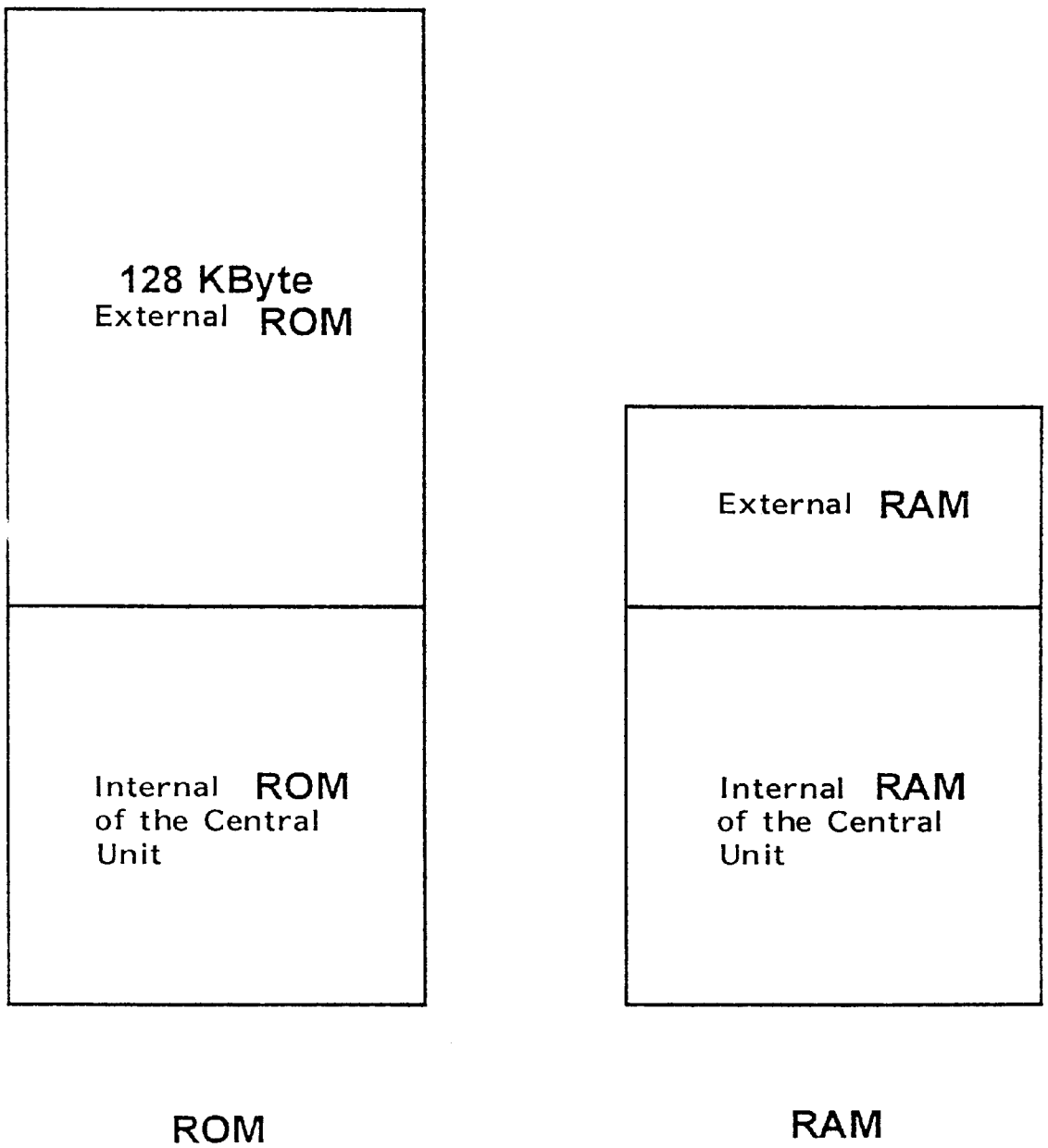

The description which follows proceeds from a control system in the form of the motor vehicle control apparatus shown in FIG. 4 and to which detailed reference has been already made. That is, the control system can have a central unit 11 in the form of a microcontroller of the INTEL 8051 family, an external nonvolatile memory unit 12 in the form of the above-mentioned flash EPROM and an external volatile memory unit 13 in a form of a "normal" RAM.

The central control unit 11 has 16 address lines A0 to A15 via which a memory having a capacity of 64 Kbyte can be addressed.

The nonvolatile memory unit 12 has a memory capacity of 128 Kbyte.

The volatile memory unit 13 has a memory capacity of 8 Kbyte.

This specific configuration of the control system is however only selected for explanatory purposes and the applicability of the present invention is not limited to such a system. As a central unit 11, as external nonvolatile memory unit 12 and as external volatile memory unit 13, any representatives of the particular groups can be selected independently of each other. The memory capacity and the subdivision thereof to several memory banks as well as the size and number of memory banks are oriented to the technical data of the central unit 11 but can be selected with complete freedom.

The nonvolatile memory unit has, in the embodiment considered, a memory capacity which is with 128 Kbyte twice as large as the memory capacity of 64 Kbyte which can be addressed via the address lines of the central unit. The 128 Kbyte of the nonvolatile memory unit are therefore subdivided into two memory banks having a memory capacity each of 64 Kbyte. Each of the two memory banks is fully addressable via the address lines of the central unit. Access can be had simultaneously to only one of the two memory banks. An output signal of the central unit (port output signal), which is originally not provided for memory addressing, determines which of the two memory banks is the one permitting access. If required, a switchover can be made from one memory bank to the other. This operation will be explained later in greater detail.

According to the invention, the nonvolatile memory unit 12 and the volatile memory unit are controlled in such a manner that the memory bank of the nonvolatile memory unit 12, which permits access, is only partially accessible and that, for an addressing attempt via an address, which is assigned to that part of the particular memory bank to which no access can be had, the volatile memory unit 13 is shifted into a state which permits access and can be addressed via this address.

Figure 1:
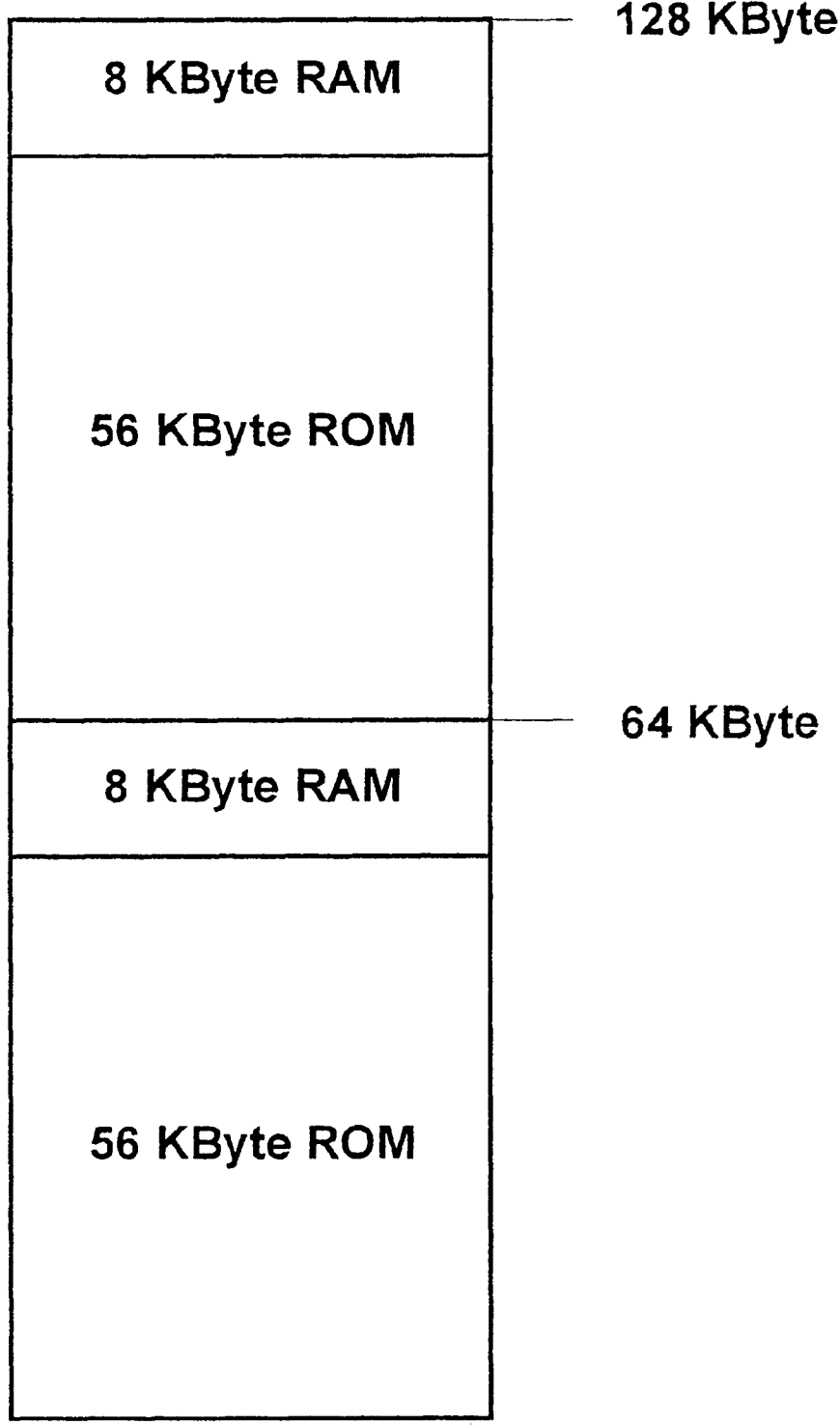
FIG. 1 is a schematic representation of a memory structure obtainable by applying the method of the invention.

As a result, one obtains a memory structure as shown in FIG. 1. The starting point for obtaining such a structure is the two memory banks of the nonvolatile memory unit 12 of which a first (lower) memory bank occupies the address space from 0 to 64 Kbyte and of which the second (upper) memory bank occupies the address space from 64 to 128 Kbyte in accordance with FIG. 1. The address space is referred to the usable memory capacity.

As shown in FIG. 1, only 56 Kbyte of the nonvolatile memory are utilized of the 64 Kbyte, which are available per memory bank. The remaining 8 Kbyte of the nonvolatile memory are replaced (covered over) in each case by a volatile memory unit.

The memory region, which is formed by the volatile memory unit, includes the uppermost 8 Kbyte of each memory bank. A positioning of this kind of the RAM region within each 64 Kbyte block makes possible an especially simple practical realization of the method, as will be shown later. Basically, the RAM section can come to rest at any desired location within each memory bank.

The replacement of parts of the nonvolatile memory by the volatile memory takes place with an address-dependent memory component selection by means of the so-called memory component selection signal (chip select signal or CS signal). The CS signal is supplied to corresponding inputs of all memory components and determines via its level whether access to the particular memory component can be had or not. Only when it is determined via the particular assigned CS signal that access can be had to the particular memory component, then access can be had to this component via the addresses assigned thereto. The situation whether, at a particular time point, access can be had to a particular memory component is controlled via the time-dependent trace of the CS signals assigned to the particular memory components.

The memory region structure shown in FIG. 1 can be realized by a corresponding CS signal generation. For this purpose, a logic circuit is required which evaluates signals outputted by the central unit and generates various CS signals therefrom and supplies these CS signals to the memory units 12 and 13.

Figure 2A:
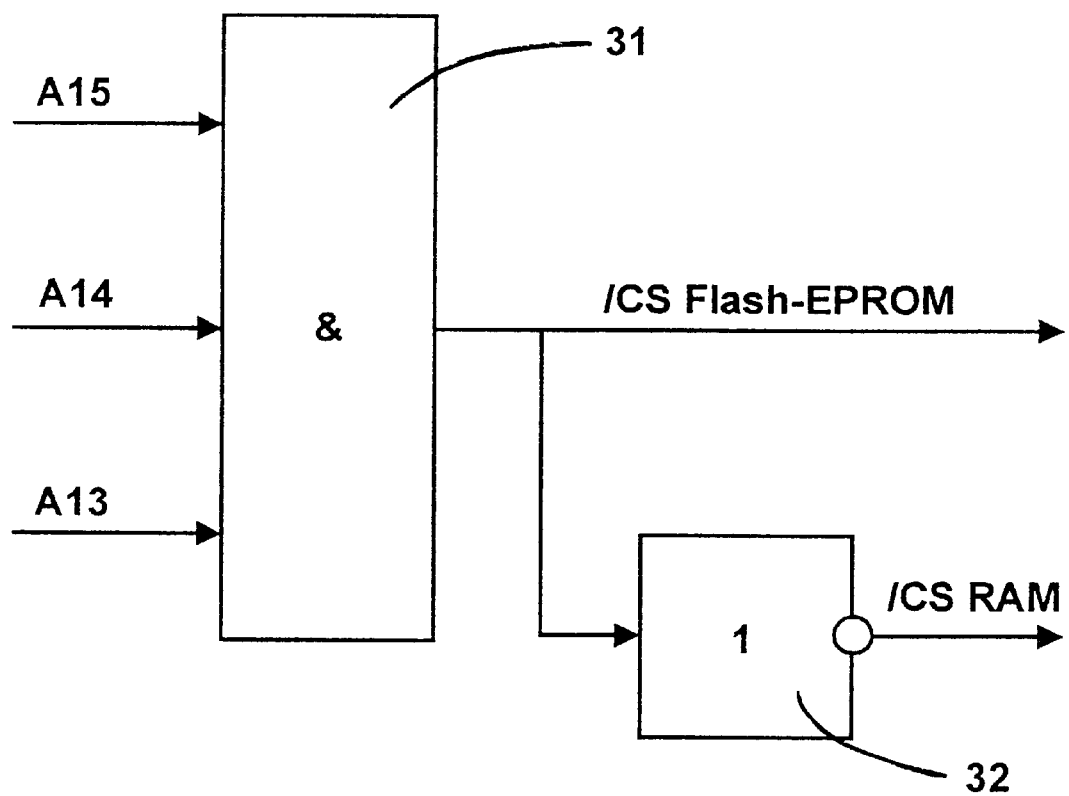
FIGS. 2A and 2B show block circuit diagrams of circuits which can be used to realize the memory structure shown in FIG. 1.

Such a CS signal generating circuit is shown in FIG. 2A. The circuit comprises an AND element 31 and an inverter 32.

The AND element 31 has three input terminals into which the address signals A13, A14 and A15 are inputted. These address signals are outputted by the central unit for memory addressing. These address signals are subjected to a logic AND operation in the AND element 31. The resulting output signal of the AND element 31 is, at the same time, the CS signal intended for the nonvolatile memory unit. The inverting output signal of the AND element 31 (that is, the output signal of the AND element 31 supplied via the inverter) is the CS signal intended for the volatile memory unit.

The output signal of the AND element 31 has the value "0" when A13 or A14 or A15 have the value "0". This is the case when the address is in the range between 0 and 56K. This address is outputted by the central unit in binary form and is represented via the 16 address lines A0 to A15 of the central unit. The value "0" of the output signal of the AND element 31 effects in the nonvolatile memory unit that this nonvolatile memory unit is accessible. The output signal is at the same time the CS signal for the nonvolatile memory unit 12. On the other hand, the CS signal for the volatile memory unit 13, which is complementary to the CS signal for the nonvolatile memory unit 12, effects that the volatile memory unit 13 is not accessible in this case.

The output signal of the AND element 31 has the value "1" when A13 and A14 and A15 have the value "1". This is the case when the address lies in the space between 56K and 64K. These addresses are outputted by the central unit in binary form and are represented by the 16 address lines A0 to A15 of the central unit. The value "1" of the output signal of the AND element 31 effects in the nonvolatile memory unit that this nonvolatile memory unit cannot be accessed. The output signal of the AND element 31 is, at the same time, the CS signal for the nonvolatile memory unit 12. On the other hand, the signal CS–RAM=0 effects for the volatile memory unit 13 that the volatile memory unit can be accessed. The CS–RAM=0 signal for the volatile memory unit 13 is complementary to the signal for the nonvolatile memory unit 12.

The described generation of the CS signal has the positive effect that for each address of the address space of 0 to 64K, which can be addressed by the central unit 11, only either the nonvolatile memory unit 12 or the volatile memory unit 13 can be addressed. More specifically, access to the nonvolatile memory unit is possible exclusively for addresses between 0 and 56K and, for addresses between 56K and 64K, access is possible exclusively to the volatile memory unit. Collisions between the nonvolatile memory unit and the volatile memory unit are thus reliably precluded notwithstanding the intertwining and overlapping.

The explanations provided above for generating the CS signal for the nonvolatile memory unit 12 are incomplete insofar as it has not yet been explained to which of the several memory banks of the nonvolatile memory unit access is permitted because of the CS signal generated in FIG. 2A. For this purpose, and when more than one memory bank is present, an additional evaluation of the output signals (which concern the memory bank selection) of the central unit 11 is necessary. The memory bank selection, or more precisely, providing a CS signal permitting access for the particular selected memory bank and providing a CS signal preventing access for all other memory banks, takes place with a logic coupling or decoding of the output signals of the central unit 11 which are to be applied for memory bank selection. This logic coupling can be integrated into the AND element 31 (the AND element 31 is then no longer an AND element) or can be connected downstream of the AND element 31.

Independently of the type of realization of the memory bank selection and/or memory bank switchover, it must be ensured that the CS signal, which is provided for the volatile memory unit, remains unaffected, that is, its state is therefore only dependent upon the addresses outputted via the address lines of the central unit. In this way, the volatile memory always remains the same physically independently of the activated memory bank and can be addressed under the same addresses. This, in turn, has the most positive effect that programs stored in the volatile memory can be executed completely uninfluenced by the state of the nonvolatile memory unit.

The provision of a memory structure which corresponds to the illustration in FIG. 1, can be utilized usefully as follows: always, when in the course of processing a program, which is stored in the nonvolatile memory unit, problems can occur which are based on the situation that the nonvolatile memory is temporarily not in a state, which guarantees a fault-free program processing, then the particular program or the particular program section is first copied in advance of the start of its execution from the nonvolatile memory into the volatile memory and thereafter, for carrying out this program, branching occurs to the corresponding location within the volatile memory. After the program of concern is taken out of the volatile memory, that is, for example, after a reprogramming of the nonvolatile memory or after a memory bank switchover has taken place, the program sequence again branches back to the nonvolatile memory in order to continue the execution of the programs stored therein.

As mentioned above, it is conventional to provide programs and data in mutually separate memory areas, that is, not to mix the same with each other.

In order to prevent, for an intended data transfer, that access is provided to a memory section operated as a program memory, and, in order to prevent that in a command opcode fetch access be provided to a memory section operated as a data memory, the central unit outputs output signals PSEN (program store enable) and RD (read data), with respect to which particular memory areas for the desired action are enabled or are inhibited. More precisely, the signal PSEN=0 effects enabling of the program memory and the signal RD=0 effects enabling of the data memory.

The nonvolatile memory is, as a rule, the program memory and the volatile memory is, as a rule, used as the data memory.

A digression from the usual practice is needed in order to permit the volatile memory, which replaces parts of the nonvolatile memory in the described embodiment, to also be used as a program memory.

Figure 2B:
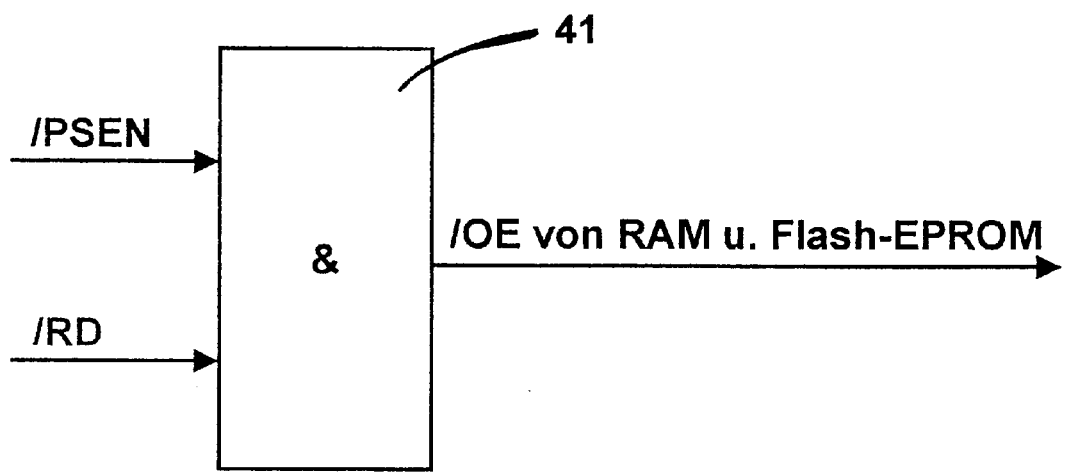

An especially advantageous solution to this problem is presented in FIG. 2B. In FIG. 2B, the above-mentioned signals PSEN and RD are subjected to an AND logic operation by an AND element 41 and the signal OE (output enable) resulting therefrom (outputted from AND element 41) is transmitted to the volatile memory unit in lieu of the signal RD. The signal OE, which is generated by the AND element 41, can also be transmitted in lieu of the signal PSEN to the nonvolatile memory unit. In this way, and in a simple manner, the entire memory can be used as data memory and as program memory. This is especially significant for the volatile memory unit 13 because, in this way, a separate volatile memory must not be provided for use as a program memory; instead, the memory unit, which has previously been used exclusively as a data memory and which is anyhow available, can be given the additional function as a program memory.

From the foregoing explanations, it is clear that, when applying the method of the invention, an internal nonvolatile memory unit provided in the central unit can be omitted without it being necessary to provide increased hardware at another location or to assume significant other disadvantages.

Figure 3:
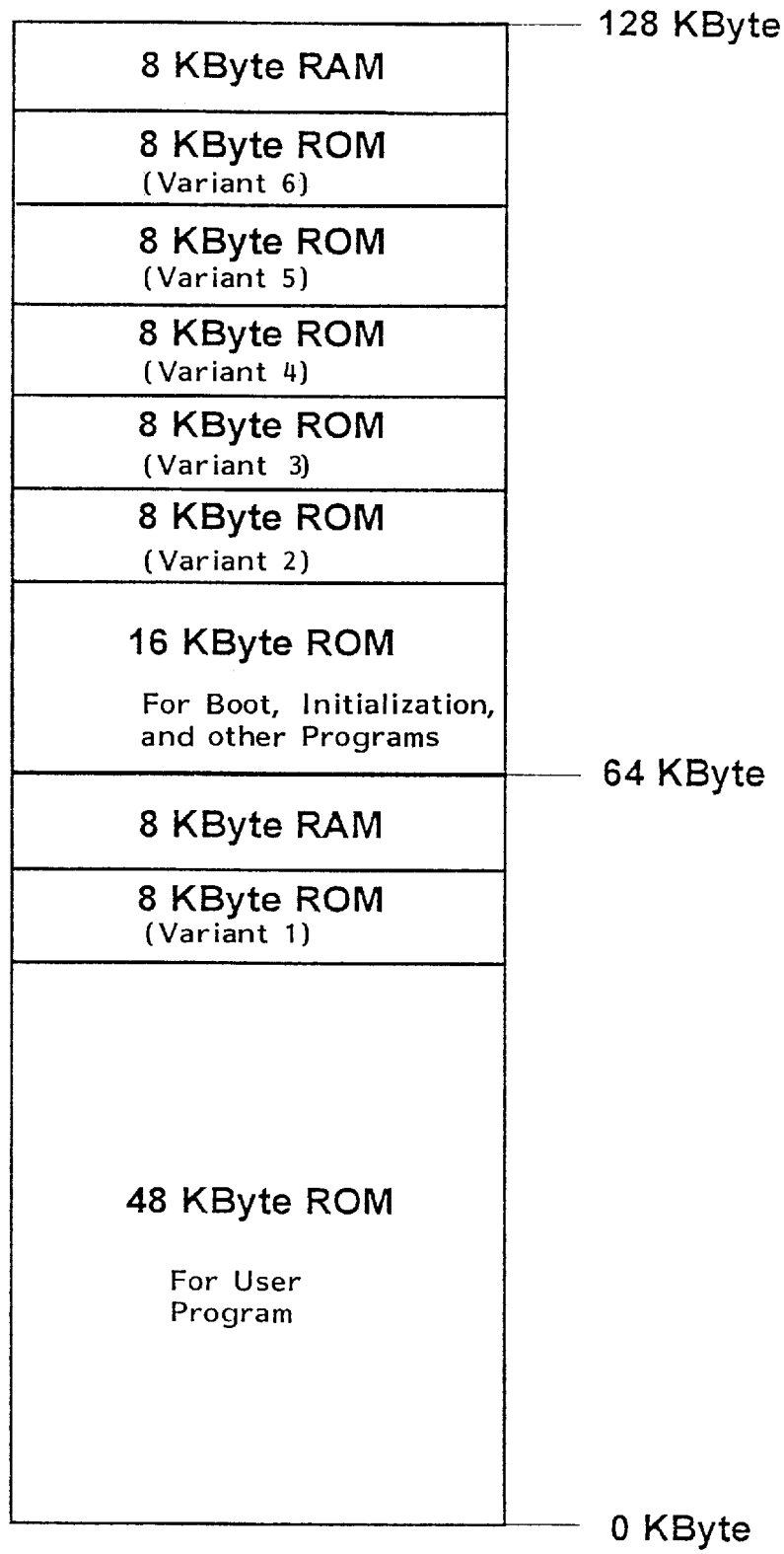
FIG. 3 is an advantageous allocation of a memory, which is structured as shown in FIG. 1, with programs and data.

Referring to FIG. 3, several selected operating phases of the motor vehicle control apparatus are described which are intended to make clear the advantageous applicability of the method of the invention in the context of a practical example.

The memory of the central unit of the motor vehicle control apparatus (which covers a total address space of 128 Kbyte) is preallocated as explained below.

In the first (lower) memory bank (that is, in the area from 0 to 64K of the shown address space), the lower 56 Kbyte are formed by a nonvolatile memory unit in the form of a flash EPROM (this being in coincidence with the schematic of FIG. 1); whereas, the upper 8 Kbyte are formed by a volatile memory unit in the form of a normal RAM. The same applies to the second (upper) memory bank, that is, for the area from 64K to 128K of the shown address space.

At this point, it is again noted that the 8 Kbyte RAM is formed at the upper end of each of the two memory banks by physically identical memories. That is, the 8 Kbyte RAM are only present a single time and furthermore, in order to, for example, execute a program, which is copied into the RAM, during a memory bank switchover without complications, are always addressable in the same manner (under the same addresses). The memory area of 128 Kbyte (addressable by the central unit) is therefore formed by 112 Kbyte flash EPROM and 8 Kbyte RAM, that is, a total of 120 Kbyte of real physically accessible memory.

The lowermost 48 Kbyte of the lower memory bank are occupied by user programs and the 8 Kbyte which continue therefrom are occupied by data corresponding to a variant 1.

The lowermost 16 Kbyte of the upper memory bank are occupied by boot routines and initialization routines and the five 8 Kbyte areas which extend therefrom are occupied by data corresponding to a variant 2, a variant 3, a variant 4, a variant 5 and a variant 6.

The uppermost 8 Kbyte of each 64 Kbyte area (that is, the particular sections of the address space formed by the RAM) exhibit no fixed occupation; instead, they are provided as a flexible intermediate memory for receiving data and programs.

The multiplicity of stored data records (that is, the data according to the variants 1 to 6) are provided in order to be able to adapt the control, which is undertaken via the motor vehicle control apparatus, to the given conditions (for example, different motor types). The data records are (as shown from the above description and FIG. 3) primarily stored in the upper 64K address space.

When switching on the motor vehicle control apparatus or after a reset of the central unit, the central unit starts with the execution of the boot and initialization routines stored in the upper 64 Kbyte space. After executing the same, a switchover into the lower space is indicated in order to there continue with the execution of the user programs (that is, the actual control programs). For this purpose, a memory bank switchover is required. For this purpose, a memory bank switchover routine stored in the upper memory space is copied into the RAM space which is identical for the upper and the lower memory bank and is executed from there. The switchover operation which then takes place from the upper to the lower memory bank influences in no way the RAM area, more precisely, the availability of the RAM area, that is, the RAM area is fully available without interruption, which is in contrast to the ROM area. After executing the memory bank switchover, a backjump into the ROM area takes place, that is, an execution of the user program stored in the lower 64 Kbyte memory space and, utilizing the data record variant (variant 1 in the present embodiment) which is stored in the lower memory space. In the normal case, there is no further movement out of the lower 64 Kbyte memory space.

In addition to the above-described memory bank switchover, a reprogramming of the flash EPROM and a change of the data record variant, which is to be used from now on, utilize effectively the advantages obtained with the method of the invention.

The reprogramming of the flash EPROM requires a special manipulation because, and as mentioned initially above, the flash EPROM is not available or only available to a very limited extent during the reprogramming operation to read out program steps and data stored therein.

A change of the data record variant to be used henceforth requires a special manipulation because here, to avoid frequent memory bank switchovers during each execution of the user program, which uses the selected data record, a recopying of the data record variant, which is to be used henceforth, should take place into the memory area in which the program utilizing the data record is stored. For this purpose, a multiple switching between the memory banks is necessary however for a short time during which time the flash EFROM for reading out program steps and data is not available or only available to a limited extent.

Also in the above-mentioned cases, the program, which executes the particular operation, is first copied from the ROM area into the RAM area and, thereafter, is executed from the RAM area. After ending the execution, a backjump into the ROM area takes place in order to execute additional programs from there.

The described data record variant exchange has been shown in practice to be very useful because it is possible to simply and rapidly adjust a motor vehicle control apparatus to the particular situation. The motor vehicle control apparatus is prepared for the most different application cases. To start the data record variant exchange, it is already sufficient that the motor vehicle control apparatus is instructed (for example, via the external programming apparatus 2 shown in FIG. 4) which data record variation is intended to be used during operation of the control apparatus. If this instruction by the programming apparatus is stored within the control apparatus (for example in an EEPROM), the control apparatus can initiate copying the necessary data record variant from the upper memory space into the lower memory space. The data record copied from the upper memory space into the lower memory space is copied to that location where the data record initially stands or stood in accordance with variant 1. If the data record which is located there cannot be simply overwritten, it can be considered to copy the same into the upper memory space. The RAM memory space can then be used as a data intermediate memory. This RAM memory space is in this case dimensioned correspondingly large.

The described method has been shown to be most flexible and certainly more flexible than the internal ROM of the central unit replaced thereby. This is so, even though it permits a reduction of hardware complexity.

It is understood that the foregoing description is that of the preferred embodiments of the invention and that various changes and modifications may be made thereto without departing from the spirit and scope of the invention as defined in the appended claims.

What is claimed is:

1. A method of operating a control system which includes a nonvolatile memory unit having memory banks and a volatile memory unit for storing programs and data, and wherein access is permitted to only a single one of said memory banks of said nonvolatile memory unit at a given time point and the memory bank permitting said access is addressable by using addresses which are located within a memory bank address space, the memory bank address space being common to all memory banks and adapted to the size of the memory banks, the method comprising the steps of:

driving said nonvolatile memory unit and said volatile memory unit in such a manner that said memory bank of the nonvolatile memory unit permitting said access is only accessible in part;

when an addressing attempt is made via an address, which is assigned to that part of the particular memory bank of the nonvolatile memory unit which is not accessible, shifting said volatile memory unit into a state permitting an access to replace that part of the particular memory bank which is not accessible;

setting the state, which permits access or refuses access, of each of the memory units by supplying corresponding memory component selection signals to said memory units; and, addressing said volatile memory unit via said address.

2. The method of claim 1, wherein said nonvolatile memory unit is a reprogrammable nonvolatile memory unit.

3. The method of claim 2 wherein the memory component selection signal provided for said volatile memory unit is fixed in exclusive dependence upon the address via which the memory units are addressed at the particular point in time.

4. The method of claim 3, wherein the memory component selection signals, which are provided for the nonvolatile memory unit, are fixed in dependence upon the memory bank to be selected and in dependence upon the address via which the memory units are addressed at the particular point in time.

5. The method of claim 4, wherein the memory component selection signal, which is provided for the volatile memory unit, has, in each case, a state which is complimentary to the state of the memory component selection signal, which is provided for the selected memory bank of the nonvolatile memory unit.

6. The method of claim 1, wherein programs, which are stored in the nonvolatile memory unit, are restored in the volatile memory unit and are executed from the volatile memory unit when, as a consequence of executing said programs, the nonvolatile memory unit is at least temporarily not available for reading.

7. The method of claim 1, wherein a multiplicity of data records are stored in the nonvolatile memory unit and a specific one of said data records can be selected for use.

8. The method of claim 7, wherein, if said selected data record is stored in another one of said memory banks than in a memory bank wherein a user program is stored utilizing said data record, the selected data record is copied into that memory bank in which the user program is located.

9. A method of operating a control system which includes a nonvolatile memory unit having memory banks and a volatile memory unit for storing programs and data, and wherein access is permitted to only a single one of said memory banks of said nonvolatile memory unit at a given time point and the memory bank permitting said access is addressable by using addresses which are located within a memory bank address space, the memory bank address space being common to all memory banks and adapted to the size of the memory banks, the method comprising the steps of:

driving said nonvolatile memory unit and said volatile memory unit in such a manner that said memory bank of the nonvolatile memory unit permitting said access is only accessible in part;

when an addressing attempt is made via an address, which is assigned to that part of the particular memory bank of the nonvolatile memory unit which is not accessible, shifting said volatile memory unit into a state permitting an access to replace that part of the particular memory bank which is not accessible;

setting the state, which permits access or refuses access, of each of the memory units by supplying corresponding memory component selection signals to said memory units;

addressing said volatile memory unit via said address; and, the memory component selection signal provided for said volatile memory unit is fixed in exclusive dependence upon the address via which the memory units are addressed at the particular point in time.

10. A method of operating a control system which includes a nonvolatile memory unit having memory banks and a volatile memory unit for storing programs and data, and wherein access is permitted to only a single one of said memory banks of said nonvolatile memory unit at a given time point and the memory bank permitting said access is addressable by using addresses which are located within a memory bank address space, the memory bank address space being common to all memory banks and adapted to the size of the memory banks, the method comprising the steps of:

driving said nonvolatile memory unit and said volatile memory unit in such a manner that said memory bank permitting said access is only accessible in part;

when an addressing attempt is made via an address, which is assigned to that part of the particular memory bank which is not accessible, shifting said volatile memory unit into a state permitting an access;

setting the state, which permits access or refuses access, of each of the memory units by supplying corresponding memory component selection signals to said memory units;

addressing said volatile memory unit via said address; and, programs, which are stored in the nonvolatile memory unit, are restored in the volatile memory unit and are executed from the volatile memory unit when, as a consequence of executing said programs, the nonvolatile memory unit is at least temporarily not available for reading.

11. A method of operating a control system which includes a nonvolatile memory unit having memory banks and a volatile memory unit for storing programs and data, and wherein access is permitted to only a single one of said memory banks of said nonvolatile memory unit at a given time point and the memory bank permitting said access is addressable by using addresses which are located within a memory bank address space, the memory bank address space being common to all memory banks and adapted to the size of the memory banks, the method comprising the steps of:

driving said nonvolatile memory unit and said volatile memory unit in such a manner that said memory bank permitting said access is only accessible in part;

when an addressing attempt is made via an address, which is assigned to that part of the particular memory bank which is not accessible, shifting said volatile memory unit into a state permitting an access;

setting the state, which permits access or refuses access, of each of the memory units by supplying corresponding memory component selection signals to said memory units;

addressing said volatile memory unit via said address; and, wherein a multiplicity of data records are stored in the nonvolatile memory unit and a specific one of said data records can be selected for use; and, if said selected data record is stored in another one of said memory banks than in a memory bank wherein a user program is stored utilizing said data record, the selected data record is copied into that memory bank in which the user program is located.

\* \* \* \* \*